United States Patent
Wang et al.

(10) Patent No.: US 12,490,227 B2
(45) Date of Patent: Dec. 2, 2025

(54) UPLINK TRANSMISSION METHOD AND APPARATUS

(71) Applicant: HUAWEI TECHNOLOGIES CO., LTD., Guangdong (CN)

(72) Inventors: Yi Wang, Shanghai (CN); Yingjie Yu, Shanghai (CN); Su Huang, Shanghai (CN); Yinghao Guo, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 442 days.

(21) Appl. No.: 18/057,234

(22) Filed: Nov. 21, 2022

(65) Prior Publication Data

US 2023/0079177 A1    Mar. 16, 2023

Related U.S. Application Data

(63) Continuation of application No. PCT/CN2021/095320, filed on May 21, 2021.

(30) Foreign Application Priority Data

May 22, 2020    (CN) .......................... 202010442109.6

(51) Int. Cl.
*H04W 64/00*    (2009.01)
*H04W 8/02*    (2009.01)
(Continued)

(52) U.S. Cl.
CPC .......... *H04W 64/006* (2013.01); *H04W 8/02* (2013.01); *H04W 48/16* (2013.01); *H04W 72/1268* (2013.01)

(58) Field of Classification Search
CPC . H04W 8/02; H04W 72/1268; H04W 64/006; H04W 48/16; H04W 72/51;
(Continued)

(56) References Cited

U.S. PATENT DOCUMENTS

| | | |
|---|---|---|
| 2013/0237245 A1 | 9/2013 | Tinnakornsrisuphap et al. |
| 2017/0171835 A1 | 6/2017 | Kvist et al. |
| 2021/0007023 A1* | 1/2021 | Umapathy ........ H04W 36/0061 |

FOREIGN PATENT DOCUMENTS

| | | |
|---|---|---|
| CN | 102036327 A | 4/2011 |
| CN | 102388653 A | 3/2012 |

(Continued)

OTHER PUBLICATIONS

Ericsson: "Text Proposal and Discussion on Indoor Outdoor Information", 3GPP Draft; R1-153747,Aug. 23, 2015, XP051001195, total 3 pages.

(Continued)

*Primary Examiner* — Diane D Mizrahi

(57) ABSTRACT

This application discloses an indoor-outdoor determining-based uplink transmission method and apparatus. A terminal device or a positioning device determines whether the terminal device is located indoors or outdoors. The terminal device or the positioning device sends a first message to an access network device, where the first message includes a first information element, and the first information element indicates whether the terminal device is located indoors or outdoors. The access network device determines an access parameter of the terminal device based on the first information element, where the access parameter includes an access frequency. According to the method disclosed in embodiments of this application, uplink transmission of the terminal device in a proper frequency band is implemented, and communication interference is reduced.

18 Claims, 7 Drawing Sheets

(51) Int. Cl.
*H04W 48/16* (2009.01)
*H04W 72/1268* (2023.01)

(58) Field of Classification Search
CPC . H04W 48/04; H04W 64/00; H04W 72/0453; H04W 4/02; H04W 4/33; H04W 4/021; H04W 4/025; H04W 4/30; H04W 24/08; H04L 67/52; G01S 5/012
See application file for complete search history.

(56) References Cited

FOREIGN PATENT DOCUMENTS

| | | |
|---|---|---|
| CN | 103747522 A | 4/2014 |
| CN | 105589506 A | 5/2016 |
| CN | 108141802 A | 6/2018 |
| EP | 3509383 A1 | 7/2019 |
| KR | 20200013692 A | 2/2020 |

OTHER PUBLICATIONS

Ericsson: "Defining indoor/outdoor classification for enhanced indoor positioning", 3GPP Draft; R1-1610387,Oct. 9, 2016-, XP051150397, total 4 pages.

3GPP TS 38.413 V16.0.0 (Dec. 2019), 3rd Generation Partnership Project; Technical Specification Group Radio Access Network; NG-RAN; NG Application Protocol (NGAP)(Release 16), 335 pages.

3GPP TS 38.331 V15.5.1 (Apr. 2019), 3rd Generation Partnership Project; Technical Specification Group Radio Access Network; NR; Radio Resource Control (RRC) protocol specification(Release 15), 491 pages.

3GPP TS 38.305 V16.0.0 (Mar. 2020), 3rd Generation Partnership Project; Technical Specification Group Radio Access Network; NG Radio Access Network (NG-RAN); Stage 2 functional specification of User Equipment (UE) positioning in NG-RAN(Release 16), 107 pages.

* cited by examiner

UPLINK TRANSMISSION METHOD AND APPARATUS

CROSS-REFERENCE TO RELATED APPLICATIONS

This application is a continuation of International Application No. PCT/CN2021/095320, filed on May 21, 2021, which claims priority to Chinese Patent Application No. 202010442109.6, filed on May 22, 2020. The disclosures of the aforementioned applications are hereby incorporated by reference in their entireties.

TECHNICAL FIELD

This application relates to the field of positioning technologies, and in particular, to an uplink transmission method and apparatus.

BACKGROUND

A new radio (New Radio, NR) system usually uses a 3.5 GHz frequency band for communication and transmission. Considering different transmit power between a base station and a terminal, asymmetric uplink and downlink coverage, and insufficient uplink coverage, NR R15 proposes a super uplink (Supplementary Uplink, SUL) technology, in which an uplink uses a low frequency band with better coverage, which is used together with 3.5 GHz for uplink transmission. SUL uses some frequencies of the low frequency band. The frequencies and 3.5 GHz all can be used to perform uplink transmission, but cannot be used to perform sending simultaneously. Currently, SUL 2.1 GHz has been put into commercial use, and a SUL frequency band that is more suitable for 5G is being sought to meet future service requirements. 2.3 GHz may be used as a next target frequency band of SUL. However, in order not to interfere with a military radar, only indoor terminals can perform access at 2.3 GHz during uplink connection, in compliance with spectrum regulations. Therefore, indoor or outdoor location recognition of users becomes a problem to be resolved, and relatively high accuracy needs to be ensured.

In addition, indoor or outdoor location recognition of terminals is intensively required in network planning and optimization, such as planning and location selection of newly built indoor sites in hotspot areas, weak coverage analysis, and service carrying capacity estimation on indoor sites.

SUMMARY

Embodiments of this application provide an indoor-outdoor determining-based uplink transmission method and apparatus, to implement uplink transmission of a terminal device in a proper frequency band and reduce communication interference.

According to a first aspect, an indoor-outdoor determining-based uplink transmission method is provided. The method includes:

An access network device receives a first message, where the first message includes a first information element, and the first information element indicates whether a terminal device is located indoors or outdoors. The access network device determines an access parameter of the terminal device based on the first information element, where the access parameter includes an access frequency of the terminal device.

In a possible design, the first information element includes an indoor recognition result and/or an outdoor recognition result.

In a possible design, the indoor recognition result corresponds to a first identification result, and the outdoor recognition result corresponds to a second identification result.

In a possible design, the indoor recognition result corresponds to a default identification result, and the outdoor recognition result corresponds to a third identification result; or the indoor recognition result corresponds to a fourth identification result, and the outdoor recognition result corresponds to a default identification result.

In a possible design, the first information element represents recognition confidence, and includes a percentage or a value of the recognition confidence.

In a possible design, the access network device sends a request message to the terminal or a positioning device, to request to obtain the first information element.

According to a second aspect, an indoor-outdoor determining-based uplink transmission method is provided. The method includes:

A terminal device determines whether the terminal device is located indoors or outdoors.

The terminal device sends a first message to an access network device, where the first message includes a first information element, and the first information element indicates whether the terminal device is located indoors or outdoors.

In a possible design, before the terminal device determines whether the terminal device is located indoors or outdoors, the method further includes:

receiving a first request message from the access network device, where the first request message is used to request to obtain the first information element.

In a possible design, before the terminal device determines whether the terminal device is located indoors or outdoors, the method further includes:

receiving a second request message from a positioning device, where the second request message is used to request to obtain the first information element, and the second request message is generated by the positioning device based on a request message that is sent by the access network device and that is used to obtain the first information element.

In a possible design, that the terminal device determines whether the terminal device is located indoors or outdoors includes: The terminal device determines location information of the terminal device based on a received positioning signal, and determines, based on the location information, whether the terminal device is located indoors or outdoors; or the terminal device obtains a quantity of visible satellites, and determines, based on whether the quantity of visible satellites is greater than a first preset threshold, whether the terminal device is located indoors or outdoors; or the terminal device determines, by using a sensor parameter value, whether the terminal device is located indoors or outdoors.

In a possible design, the first message is a radio resource control RRC message, and includes a measurement report message, a terminal information response message, an RRC resume complete message, or an RRC setup complete message.

In a possible design, the first request message is an RRC message, and includes an RRC reconfiguration message, a logged measurement configuration message, or a UE information request message.

In a possible design, the method further includes: The terminal device receives a first parameter from the access network device, where the first parameter indicates an access frequency used when the terminal device initiates access to the access network device.

According to a third aspect, an indoor-outdoor determining-based uplink transmission method is provided. The method includes:

A positioning device determines whether a terminal device is located indoors or outdoors.

The positioning device sends a first message to an access network device by using an access and mobility management unit AMF, where the first message includes a first information element, and the first information element indicates whether the terminal device is located indoors or outdoors.

In a possible design, that a positioning device determines whether a terminal device is located indoors or outdoors includes: The positioning device obtains positioning measurement data from the terminal device, and determines, based on the positioning measurement data, whether the terminal is located indoors or outdoors.

In a possible design, that a positioning device determines whether a terminal device is located indoors or outdoors includes: The positioning device learns, from the terminal device, whether the terminal device is located indoors or outdoors.

In a possible design, that the positioning device sends a first message to an access network device by using an access and mobility management unit AMF includes: The positioning device sends a second message to the AMF, to trigger the AMF to send the first message to the access network device, where the second message includes the first information element.

In a possible design, before the AMF sends the first message, the method further includes:

The positioning device receives, by using the AMF, a third request message sent by the access network device, where the third request message is used to request to obtain the first information element.

In a possible design, that the positioning device receives, by using the AMF, a third request message sent by the access network device includes: The positioning device receives a fourth request message sent by the AMF, where the access network device triggers, by using the third request message, the AMF to send the fourth request message.

In a possible design, the first message or the third request message is a next generation application protocol NGAP message; and the second message and the fourth request message are network location management unit Nlmf messages.

According to a fourth aspect, a communication apparatus is provided. The apparatus includes a receiving module and a processing module.

The receiving module is configured for an access network device to receive a first message, where the first message includes a first information element, and the first information element indicates whether a terminal device is located indoors or outdoors.

The processing module is configured to determine an access parameter of the terminal device based on the first information element, where the access parameter includes an access frequency of the terminal device.

In a possible design, the communication apparatus further includes a sending module, configured to send a request message to the terminal device or a positioning device, to request to obtain the first information element.

According to a fifth aspect, a communication apparatus is provided. The apparatus includes a processing module and a sending module.

The processing module is configured to determine whether a terminal device is located indoors or outdoors.

The sending module is configured to send a first message to an access network device, where the first message includes a first information element, and the first information element indicates whether the terminal device is located indoors or outdoors.

In a possible design, the apparatus further includes a receiving module, configured to receive a first request message from the access network device, where the first request message is used to request to obtain the first information element.

In a possible design, the receiving module is configured to:

receive a second request message from a positioning device, where the second request message is used to request to obtain the first information element, and the second request message is generated by the positioning device based on a request message that is sent by the access network device and that is used to obtain the first information element.

In a possible design, the processing module is specifically configured to: determine location information of the terminal device based on a received positioning signal, and determine, based on the location information, whether the terminal device is located indoors or outdoors; or obtain a quantity of visible satellites, and determine, based on whether the quantity of visible satellites is greater than a first preset threshold, whether the terminal device is located indoors or outdoors; or determine, by using a sensor parameter value, whether the terminal device is located indoors or outdoors.

In a possible design, the receiving module is further configured to receive a first parameter from the access network device, where the first parameter indicates an access frequency used when the terminal device initiates access to the access network device.

According to a sixth aspect, a communication apparatus is provided. The apparatus includes a processing module and a sending module.

The processing module is configured to determine whether a terminal device is located indoors or outdoors.

The sending module is configured to send a first message to an access network device by using an AMF, where the first message includes a first information element, and the first information element indicates whether the terminal device is located indoors or outdoors.

In a possible design, the processing module is specifically configured to obtain positioning measurement data from the terminal device, and determine, based on the positioning measurement data, whether the terminal is located indoors or outdoors.

In a possible design, the sending module is specifically configured to send a second message to the AMF, to trigger the AMF to send the first message to the access network device, where the second message includes the first information element.

In a possible design, the apparatus further includes a receiving module, configured to receive, by using the AMF, a third request message sent by the access network device, where the third request message is used to request to obtain the first information element.

In a possible design, the receiving module is specifically configured to receive a fourth request message sent by the AMF, where the access network device triggers, by using the third request message, the AMF to send the fourth request message.

According to a seventh aspect, a communication apparatus is provided. The apparatus includes at least one processor, and the at least one processor is coupled to at least one memory.

The at least one processor is configured to execute a computer program or instructions stored in the at least one memory, to enable the apparatus to perform the method according to the first aspect, the method according to the second aspect, or the method according to the third aspect.

The apparatus may be an access network device, or may be a chip included in the access network device. Functions of the communication apparatus may be implemented by hardware, or may be implemented by hardware executing corresponding software. The hardware or software includes one or more modules corresponding to the functions.

The apparatus may be a terminal device, or may be a chip included in the terminal device. Functions of the communication apparatus may be implemented by hardware, or may be implemented by hardware executing corresponding software. The hardware or software includes one or more modules corresponding to the functions.

The apparatus may be a positioning device, or may be a chip included in the positioning device. Functions of the communication apparatus may be implemented by hardware, or may be implemented by hardware executing corresponding software. The hardware or software includes one or more modules corresponding to the functions.

According to an eighth aspect, an embodiment of this application provides a chip system, including a processor. The processor is coupled to a memory, and the memory is configured to store a program or instructions. When the program or instructions are executed by the processor, the chip system is enabled to implement the method in any one of the first aspect or the possible implementations of the first aspect, or the method in any one of the second aspect or the possible implementations of the second aspect, or the method in any one of the third aspect or the possible implementations of the third aspect.

Optionally, the chip system further includes an interface circuit, and the interface circuit is configured to send code instructions to the processor.

Optionally, there may be one or more processors in the chip system, and the processor may be implemented by hardware or software. When the processor is implemented by the hardware, the processor may be a logic circuit, an integrated circuit, or the like. When the processor is implemented by the software, the processor may be a general-purpose processor, and is implemented by reading software code stored in the memory.

Optionally, there may be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

According to a ninth aspect, an embodiment of this application provides a computer-readable storage medium, storing a computer program or instructions. When the computer program or instructions are executed, a computer is enabled to perform the method in any one of the first aspect or the possible implementations of the first aspect, or the method in any one of the second aspect or the possible implementations of the second aspect, or the method in any one of the third aspect or the possible implementations of the third aspect.

According to a tenth aspect, an embodiment of this application provides a computer program product. When a computer reads and executes the computer program product, the computer is enabled to perform the method in any one of the first aspect or the possible implementations of the first aspect, or the method in any one of the second aspect or the possible implementations of the second aspect, or the method in any one of the third aspect or the possible implementations of the third aspect.

According to an eleventh aspect, an embodiment of this application provides a communication system. The communication system includes one or more access network devices and a terminal device that are described above. Optionally, the communication system may further include one or more positioning devices.

BRIEF DESCRIPTION OF DRAWINGS

To describe the technical solutions in embodiments of the present invention or in the conventional technology more clearly, the following briefly describes the accompanying drawings for describing embodiments.

DESCRIPTION OF EMBODIMENTS

The following describes technical solutions in embodiments of this application with reference to the accompanying drawings in embodiments of this application.

The technical solutions in the embodiments of this application may be applied to various communication systems, for example, a long term evolution (long term evolution, LTE) system, an LTE frequency division duplex (frequency division duplex, FDD) system, an LTE time division duplex (time division duplex, TDD) system, a fifth generation (5th generation, 5G) system, a new radio (new radio, NR) system, or a next-generation communication system, such as 6G. A 5G mobile communication system in this application includes a non-standalone (non-standalone, NSA) 5G mobile communication system or a standalone (standalone, SA) 5G mobile communication system. The technical solutions provided in this application may also be applied to a future communication system, for example, a sixth generation mobile communication system. The communication system may alternatively be a public land mobile network (public land mobile network, PLMN), a device-to-device (device-to-device, D2D) communication system, a machine to machine (machine to machine, M2M) communication system, an Internet of things (Internet of Things, IoT), an Internet of vehicles communication system, or another communication system.

Figure 1A:
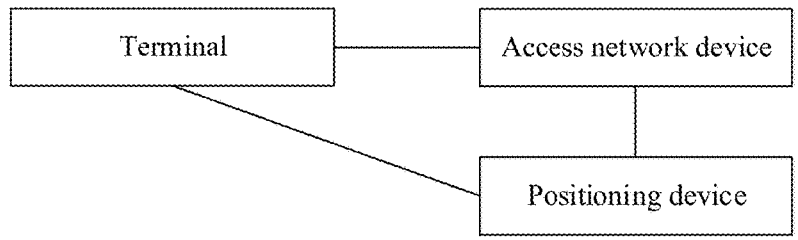
FIG. 1A is a schematic diagram of an architecture of a positioning system to which a terminal positioning method according to an embodiment of this application is applied.

FIG. 1A is a schematic diagram of an architecture of a positioning system to which a terminal positioning method according to an embodiment of this application is applied. As shown in FIG. 1A, the positioning system includes a terminal, one or more access network devices (one access network device is used as an example for illustration in FIG. 1A), and a positioning device. The terminal, the access network device, and the positioning device may directly communicate with each other, or may communicate with each other through forwarding or some other form of routing by another device. This is not specifically limited in this embodiment of this application. Although not shown, the positioning system may further include another network element such as a mobility management network element. This is not specifically limited in this embodiment of this application.

Optionally, the positioning device in this embodiment of this application may be a location management function (LMF) network element or a location management component (LMC) network element, or may be a local location management function (LLMF) network element located in a network device.

Optionally, the positioning system provided in this embodiment of this application is applicable to the foregoing communication systems. A 5G mobile communication system is used as an example. A network element or entity corresponding to the access network device in FIG. 1A may be a next-generation radio access network (NG-RAN) device in the 5G mobile communication system. A network element or entity corresponding to the mobility management network element may be an access and mobility management function (AMF) network element in the 5G mobile communication system. This is not specifically limited in this embodiment of this application.

Figure 1B:
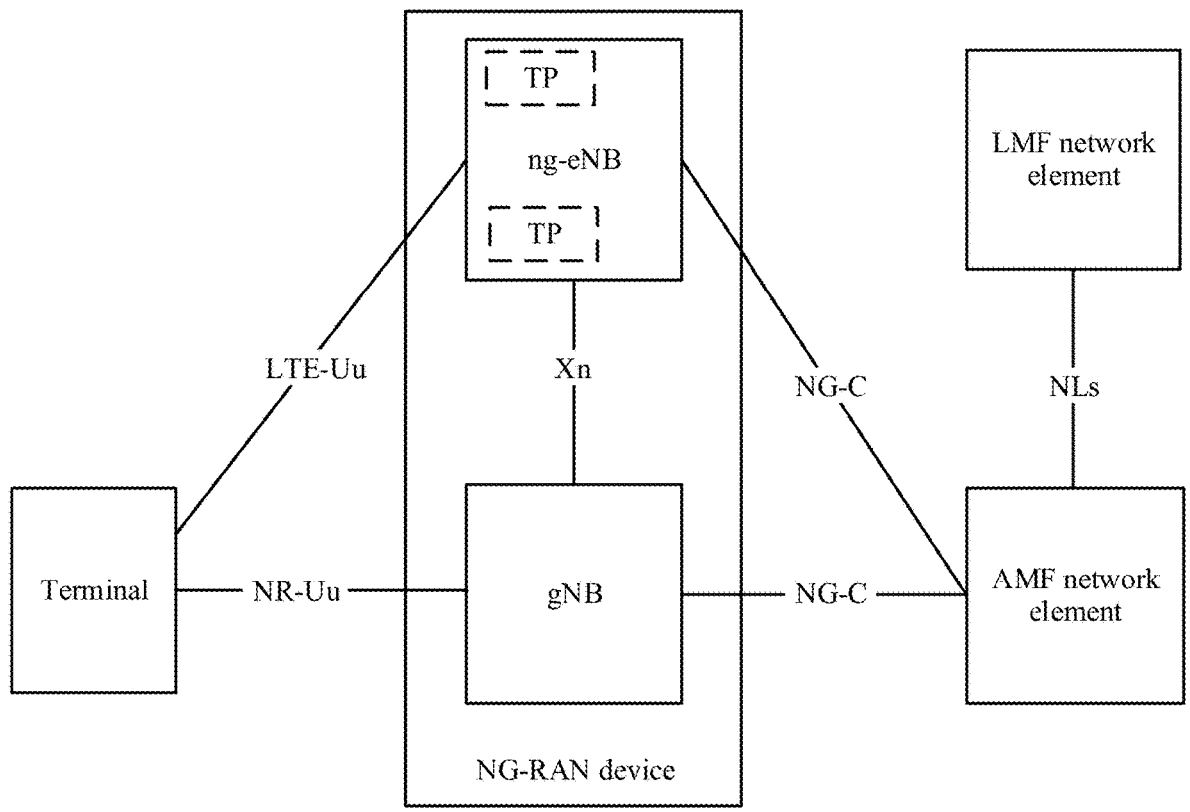
FIG. 1B is a schematic diagram of an architecture of a positioning system to which a terminal positioning method according to an embodiment of this application is applied in a 5G mobile communication system.

For example, FIG. 1B is a schematic diagram of an architecture of a positioning system to which a terminal positioning method according to an embodiment of this application is applied in a 5G mobile communication system. As shown in FIG. 1B, in the positioning system, a terminal is connected to a radio access network by using LTE-Uu via a next-generation evolved node B (next-generation evolved NodeB, ng-eNB), or by using an NR-Uu interface via a next-generation node B (next-generation node B, gNB). The radio access network is connected to a core network by using an NG-C interface via an AMF network element. The NG-RAN includes one or more ng-eNBs (one ng-eNB is used as an example for illustration in FIG. 1B), or the NG-RAN may include one or more gNBs (one gNB is used as an example for illustration in FIG. 1B), or the NG-RAN may include one or more ng-eNBs and one or more gNBs. The ng-eNB is an LTE base station that accesses the 5G core network, and the gNB is a 5G base station that accesses the 5G core network. The core network includes the AMF network element and an LMF network element. The AMF network element is configured to implement functions such as access management, and the LMF network element is configured to implement functions such as positioning or positioning assistance. The AMF network element and the LMF network element are connected by using an NLs interface.

Figure 1C:
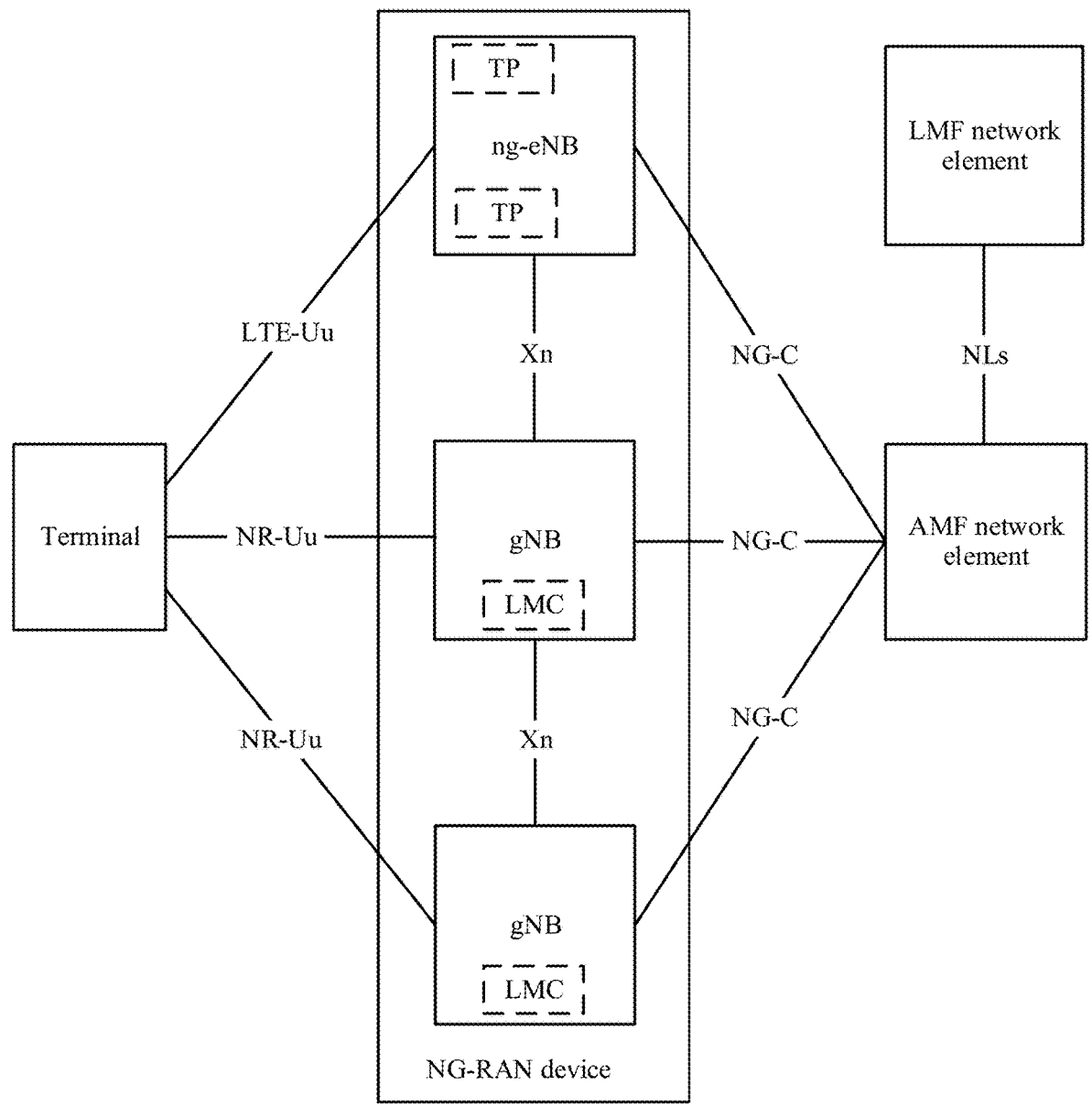
FIG. 1C is a schematic diagram of an architecture of another positioning system to which a positioning method according to an embodiment of this application is applied in a 5G mobile communication system.

For example, FIG. 1C is a schematic diagram of an architecture of another positioning system to which a positioning method according to an embodiment of this application is applied in a 5G mobile communication system. A difference between the positioning system architectures in FIG. 1C and FIG. 1B lies in that an apparatus or component (for example, an LMF network element) with a location management function in FIG. 1B is deployed in a core network, while an apparatus or component (for example, an LMC network element) with a location management function in FIG. 1C may be deployed in an NG-RAN device. As shown in FIG. 1C, a gNB includes an LMC network element. The LMC network element is a partial functional component of an LMF network element, and may be integrated into the gNB of the NG-RAN device.

It should be understood that the device or function node included in the positioning system in FIG. 1B or FIG. 1C is merely an example for description, and does not constitute a limitation on this embodiment of this application. Actually, the positioning system in FIG. 1B or FIG. 1C may further include another network element or device or function node that has an interaction relationship with the device or function node shown in the figure. This is not specifically limited herein.

Optionally, the terminal in this embodiment of this application may be an access terminal, a user unit, a user station, a mobile station, a mobile console, a relay station, a remote station, a remote terminal, a mobile device, a user terminal (user terminal), user equipment (user equipment, UE), a terminal (terminal), a wireless communication device, a user agent, a user apparatus, a cellular phone, a cordless telephone set, a session initiation protocol (session initiation protocol, SIP) phone, a wireless local loop (wireless local loop, WLL) station, a personal digital assistant (personal digital assistant, PDA), a handheld device having a wireless communication function, a computing device or another processing device connected to a wireless modem, a vehicle-mounted device, a wearable device, a terminal in a future 5G network, a terminal in a future evolved PLMN, a terminal in a future Internet of vehicles, or the like. This is not limited in this embodiment of this application.

For example rather than limitation, in this embodiment of this application, the terminal may be a mobile phone, a tablet computer, a computer with a wireless transceiver function, a virtual reality terminal, an augmented reality terminal, a wireless terminal in industrial control, a wireless terminal in self-driving, a wireless terminal in remote surgery, a wireless terminal in a smart grid, a wireless terminal in transportation security, a wireless terminal in a smart city, or a wireless terminal in a smart home.

For example rather than limitation, in this embodiment of this application, the wearable device may also be referred to as a wearable smart device, which is a general term for wearable devices such as glasses, gloves, watches, clothes, and shoes that are developed by intelligently designing everyday wearing by applying a wearable technology. The wearable device is a portable device that is directly worn on a body or integrated into clothes or an accessory of a user. The wearable device is not merely a hardware device, but is used to implement a powerful function through software support, data interaction, and cloud interaction. In a board sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, in this embodiment of this application, the terminal may alternatively be a terminal in an Internet of things (internet of things, IoT) system. The IoT is an important component of future information technology development, and a main technical feature of the IoT is connecting objects to a network by using a communication technology, to implement an intelligent network in which humans and computers are interconnected and things are interconnected. In this embodiment of this application, an IoT technology may implement mass connection, deep coverage, and terminal power saving by using, for example, a narrow band (narrow band, NB) technology.

In addition, in this embodiment of this application, the terminal may further include a sensor such as an intelligent printer, a train detector, and a gas station. Main functions include collecting data (some terminals), receiving control information and downlink data of an access network device, and sending an electromagnetic wave, to transmit uplink data to the access network device.

Optionally, the access network device in this embodiment of this application may be any communication device that is configured to communicate with the terminal and that has a wireless transceiver function. The access network device includes but is not limited to an evolved node B (evolved node B, eNB), a baseband unit (baseband unit, BBU), an access point (access point, AP) in a wireless fidelity (wireless fidelity, Wi-Fi) system, a wireless relay node, a wireless backhaul node, a transmission point (transmission point, TP), a transmission reception point (transmission reception point, TRP), or the like. The access network device may alternatively be a gNB, a TRP, or a TP in a 5G system, or an antenna panel or an antenna panel group (including a plurality of antenna panels) of a base station in a 5G system. In addition, the access network device may alternatively be a network node that constitutes a gNB or a TP, for example, a BBU or a distributed unit (distributed unit, DU).

In some deployment, the gNB may include a centralized unit (centralized unit, CU) and the DU. In addition, the gNB may further include an active antenna unit (active antenna unit, AAU). The CU implements some functions of the gNB, and the DU implements some functions of the gNB. For example, the CU is responsible for processing a non-real-time protocol and service, to implement functions of radio resource control (radio resource control, RRC) and packet data convergence protocol (packet data convergence protocol, PDCP) layers. The DU is responsible for processing a physical layer protocol and a real-time service, to implement functions of a radio link control (radio link control, RLC) layer, a media access control (media access control, MAC) layer, and a physical layer (physical layer, PHY). The AAU implements some physical layer processing functions, radio frequency processing, and a function related to an active antenna. Information at the RRC layer eventually becomes information at the PHY layer, or is converted from the information at the PHY layer. Therefore, in the architecture, higher layer signaling such as RRC layer signaling may also be considered as being sent by the DU or sent by the DU and the AAU. It may be understood that the access network device may be a device including one or more of a CU node, a DU node, and an AAU node.

Optionally, communication between the access network device and the terminal in this embodiment of this application may use a licensed spectrum, or an unlicensed spectrum, or both a licensed spectrum and an unlicensed spectrum. The communication between the access network device and the terminal may use a spectrum below 6 gigahertz (gigahertz, GHz), or a spectrum above 6 GHz, or both a spectrum below 6 GHz and a spectrum above 6 GHz. A spectrum resource used between the access network device and the terminal 101 is not limited in this embodiment of this application.

Optionally, the terminal, the access network device, or the positioning device in this embodiment of this application may be deployed on a land, including indoor, outdoor, handheld, or in-vehicle forms, or may be deployed on a water surface, or may be deployed on an airplane, a balloon, or an artificial satellite in air. An application scenario of the terminal, the access network device, or the positioning device is not limited in this embodiment of this application.

Optionally, in this embodiment of this application, the terminal, the access network device, or the positioning device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (also referred to as a main memory). The operating system may be any one or more computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by the terminal, the access network device, or the positioning device, or a functional module that can invoke and execute the program in the terminal, the access network device, or the positioning device.

In other words, a related function of the terminal, the access network device, or the positioning device in this embodiment of this application may be implemented by one device, or may be jointly implemented by a plurality of devices, or may be implemented by one or more functional modules in one device. This is not specifically limited in this embodiment of this application. It may be understood that the function may be a network element in a hardware device, or may be a software function running on dedicated hardware, or a combination of hardware and software, or a virtualization function instantiated on a platform (for example, a cloud platform).

Figure 1D:
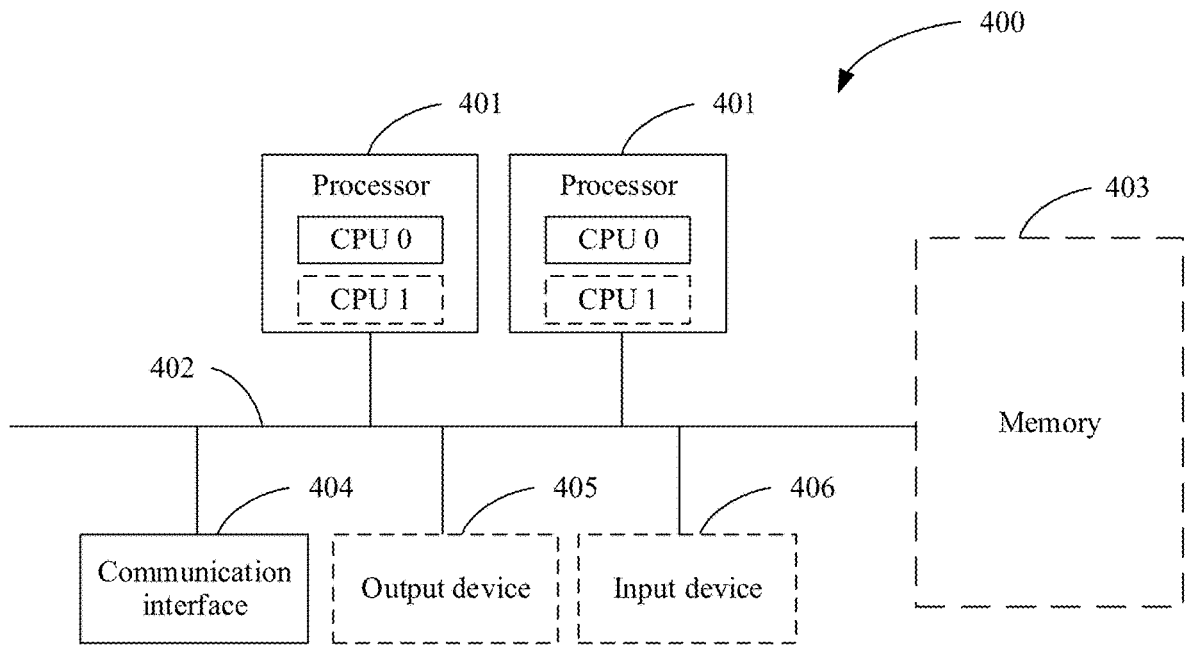
FIG. 1D is a schematic diagram of a structure of a communication apparatus according to an embodiment of this application.

For example, a related function of the terminal, the access network device, or the positioning device in this embodiment of this application may be implemented by using a communication apparatus 400 in FIG. 1D. FIG. 1D is a schematic diagram of a structure of a communication apparatus 400 according to an embodiment of this application. The communication apparatus 400 includes one or more processors 401, a communication line 402, and at least one communication interface (including a communication interface 404 and one processor 401 in FIG. 1D is merely used as an example for description). Optionally, a memory 403 may be further included.

The processor 401 may be a central processing unit (CPU), a microprocessor, an application-specific integrated circuit (application-specific integrated circuit, ASIC), or one or more integrated circuits configured to control program execution of the solutions in this application.

The communication line 402 may include a channel for connecting different components.

The communication interface 404 may be a transceiver module, configured to communicate with another device or a communication network, such as an Ethernet, a RAN, or a wireless local area network (wireless local area network, WLAN). For example, the transceiver module may be an apparatus such as a transceiver or a transceiver machine. Optionally, the communication interface 404 may alternatively be a transceiver circuit located in the processor 401, configured to implement signal input and signal output of the processor.

The memory 403 may be an apparatus having a storage function. For example, the memory 403 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another optical disk storage, an optical disc storage (including a compact disc, a laser disc, an optical disc, a digital versatile disc, a Blu-ray disc, or the like), a disk storage medium or another magnetic storage device, or any other medium that can be used to carry or store expected program code in a form of an instruction or a data structure and that can be accessed by a computer. However, the memory is not limited thereto. The memory may exist independently, and is connected to the processor through the communication line 402. Alternatively, the memory may be integrated with the processor.

The memory 403 is configured to store computer-executable instructions for performing the solutions in this application, and the processor 401 controls execution. The processor 401 is configured to execute the computer-executable instructions stored in the memory 403, to implement the positioning method provided in the embodiments of this application.

Alternatively, in this embodiment of this application, the processor 401 may perform a processing related function in the positioning method provided in the following embodiment of this application, and the communication interface 404 is responsible for communicating with another device or a communication network. This is not specifically limited in this embodiment of this application.

Computer-executable instructions in this embodiment of this application may also be referred to as application program code. This is not specifically limited in this embodiment of this application.

During specific implementation, in an embodiment, the processor 401 may include one or more CPUs such as a CPU 0 and a CPU 1 in FIG. 1D.

During specific implementation, in an embodiment, the communication apparatus 400 may include a plurality of processors, for example, a plurality of processors 401 in FIG. 1D. Each of the processors may be a single-core (single-CPU) processor or a multi-core (multi-CPU) processor. Herein, the processor may be one or more devices, circuits, and/or processing cores configured to process data (for example, computer program instructions).

During specific implementation, in an embodiment, the communication apparatus 400 may further include an output device 405 and an input device 406. The output device 405 communicates with the processor 401, and may display information in a plurality of manners.

The communication apparatus 400 may be a general-purpose apparatus or a dedicated apparatus. For example, the communication apparatus 400 may be a desktop computer, a portable computer, a network server, a palmtop computer (personal digital assistant, PDA), a mobile phone, a tablet computer, a wireless terminal, an embedded device, or a device that has a structure similar to that in FIG. 1D. A type of the communication apparatus 400 is not limited in this embodiment of this application.

The terminal positioning method provided in the embodiments of this application is specifically described below with reference to FIG. 1A to FIG. 1D.

Figure 2A:
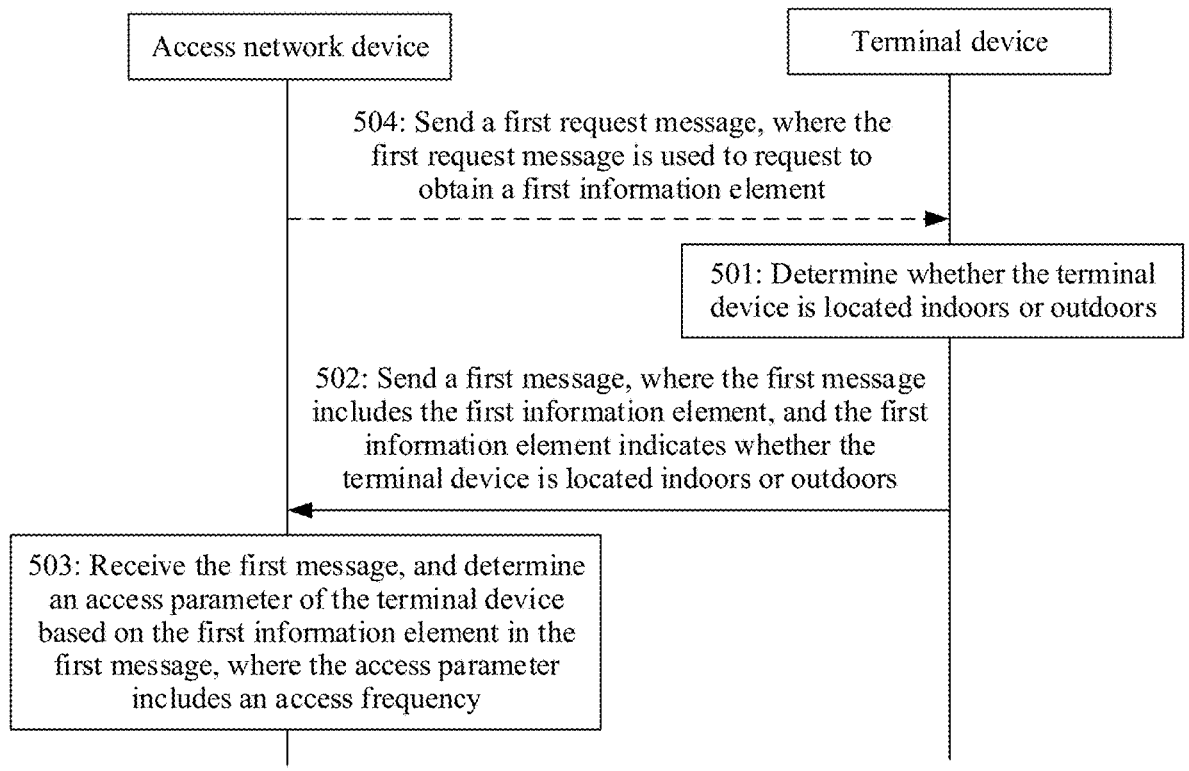
FIG. 2A is a flowchart of an indoor-outdoor determining-based uplink transmission method according to an embodiment of this application.

FIG. 2A is a flowchart of an indoor-outdoor determining-based uplink transmission method according to an embodiment of this application. As shown in FIG. 2A, the method may include the following steps.

501. A terminal device determines whether the terminal device is located indoors or outdoors.

502. The terminal device sends a first message to an access network device, where the first message includes a first information element, and the first information element indicates whether the terminal device is located indoors or outdoors.

503. The access network device receives the first message, and determines an access parameter of the terminal device based on the first information element in the first message, where the access parameter includes an access frequency.

In this embodiment of this application, a function of distinguishing indoors and outdoors is as follows: A military radar performs target detection outdoors. To avoid interference caused by industrial communication to the military radar, a terminal device can communicate with an access network device only when it is determined that the terminal device is located indoors. Therefore, locations at which the military radar may perform target detection are all defined as outdoors, and other locations are defined as indoors. For example, indoors may represent an interior of a building, including an interior of a common residence or a commercial residence, an interior of a large venue, or an interior of a natural cave. Outdoors may refer to empty space outside a building or an area without covering.

There are a plurality of methods for determining, by the terminal device, whether the terminal device is located indoors or outdoors, for example, including: The terminal device determines location information of the terminal device based on a received positioning signal, and determines, based on the location information, whether the terminal device is located indoors or outdoors; or the terminal device obtains a quantity of visible satellites, and determines, based on whether the quantity of visible satellites is greater than a first preset threshold, whether the terminal device is located indoors or outdoors; or the terminal device determines, by using a sensor parameter value, whether the terminal device is located indoors or outdoors.

Figure 2B:
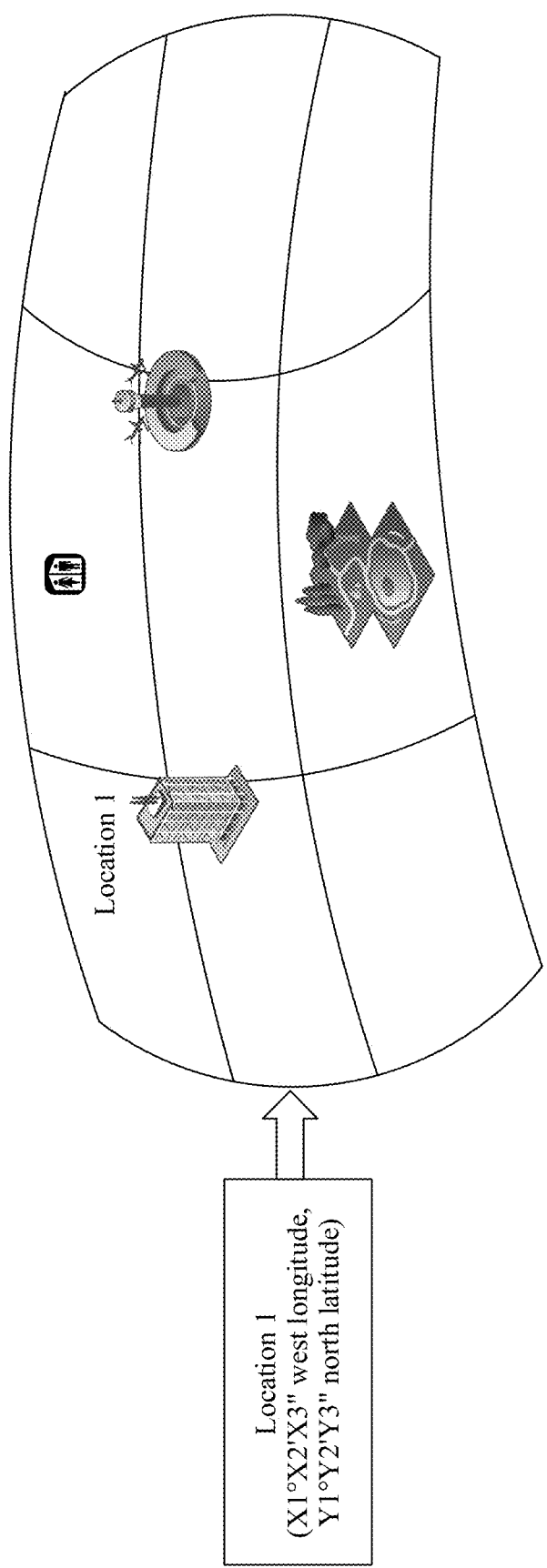
FIG. 2B is a schematic diagram of a process of determining an indoor or outdoor state according to an embodiment of this application.

Optionally, the terminal device may alternatively perform indoor-outdoor determining based on a received satellite positioning signal. The satellite signal may come from a global positioning system (GPS), Galileo, Beidou, or the like. Using the GPS as an example, a determining manner may be as follows: The terminal device obtains, through GPS positioning, location information of the terminal device, including longitude and latitude, height, or other information, and then determines, by using the location information of the terminal device with reference to a digital map, whether the terminal device is in an indoor or outdoor state. FIG. 2B is a schematic diagram of a process of determining an indoor or outdoor state according to an embodiment of this application. As shown in FIG. 2B, it is determined, based on the satellite signal, that the location information of the terminal device is a location 1, and it is determined, with reference to the digital map, that the location 1 corresponds to longitude and latitude information of a building. In this case, it may be determined that the terminal device is located indoors. Alternatively, if the location 1 determined based on the satellite signal further includes a height parameter, the height parameter is compared with a height of the building at the location 1 on the digital map. If the height parameter of the location 1 is less than the height of the building, it is determined that the terminal device is located indoors; otherwise, it is determined that the terminal device is located outdoors. Alternatively, if it is detected that the terminal device is inside a flying object, it is also determined that the terminal device is located indoors.

In addition, the terminal device may alternatively obtain the location information of the terminal device by using a 3GPP Release-16 UE-based positioning technology, including a downlink time difference of arrival such as Downlink Observation Arrival Time Difference (DL-TDOA) positioning technology, a downlink angle of departure (, DL-AoD) positioning technology, a multi-round-trip-time (, Multi-RTT) positioning technology, and the like. In this process, the terminal device measures a positioning reference signal (,PRS) sent by each access network device, and an obtained measurement quantity such as a reference signal time difference (RSTD) may be used for positioning calculation. The positioning calculation is performed on the terminal device. In a positioning process, a location management function (LMF) network element needs to send, to the terminal device, auxiliary information, including PRS configuration of each access network device, location information of the access network device, and the like. Similarly, it may be determined, with reference to the digital map by using the location information obtained by the terminal device, whether the terminal device is in an indoor or outdoor state.

Alternatively, the terminal device may determine, based on the obtained quantity of visible satellites, whether the terminal device is in an indoor or outdoor state. The quantity of visible satellites may be obtained based on camera shooting or determined based on received satellite signals. After the quantity of visible satellites is obtained, when the quantity of visible satellites is greater than or equal to the first preset threshold, it is determined that the terminal device is located outdoors; otherwise, it is determined that the device is located outdoors.

Alternatively, the terminal device may determine, by using the sensor parameter value, whether the terminal device is located indoors or outdoors. A plurality of sensors are configured on the terminal device, including but not limited to an inertial navigation sensor, a light sensor, a temperature sensor, a step counter, a barometric sensor, and a geomagnetic sensor. Indoor or outdoor state information of the terminal device may be determined by using a single sensor. For example, the light sensor detects light intensity. As indoor light is relatively weak while outdoor light is relatively strong, an indoor or outdoor state of the terminal device is determined by setting a light intensity threshold. Alternatively, the indoor or outdoor state information of the terminal device is jointly determined by using a plurality of sensors. For example, the geomagnetic sensor may measure a height of the terminal device, and the temperature sensor may measure a temperature of the terminal device. When a location of the terminal device is relatively high, and the temperature measured by the temperature sensor is relatively high, the terminal device is very likely to be located indoors.

After determining the indoor or outdoor state information of the terminal device, the terminal device sends the first message to the access network device. The first message includes the first information element used to indicate whether the terminal device is located indoors or outdoors. Optionally, the first information element may be an indoor or outdoor recognition result. For example, the indoor recognition result is represented as "in", and the outdoor recognition result is represented as "out". Alternatively, the indoor recognition result is represented as "1", and the outdoor recognition result is represented as "0". Alternatively, the indoor recognition result may be represented as "0", and the outdoor recognition result may be represented as "1". Optionally, alternatively, a default value may be used to represent the indoor recognition result, and another value may be used to represent the outdoor recognition result. Alternatively, a default value may be used to represent the outdoor recognition result, and another value may be used to represent the indoor recognition result. While binary results are shown, it is expressly contemplated that any variable or symbol could be used.

Alternatively, the first information element may be a confidence value of an indoor or outdoor recognition result, because information about recognition of whether the terminal device is located indoors or outdoors may not be completely accurate. For example, a confidence value of recognition that the terminal device is located indoors is 70%, and a confidence value of being located outdoors is 30%. Then, the confidence values of the recognition result are sent to the access network device, so that the access network device determines, based on a requirement of the access network device, whether the terminal device is located indoors or outdoors. In some cases, for example, at night or in another high alert state, the access network device requires a high confidence value of being located indoors. When a confidence value of being located indoors is greater than or equal to a first threshold, it is determined that the terminal device is located indoors. In some other cases, for example, in daytime or in another low alert state, a required confidence value of being located indoors is low. When a confidence value is greater than or equal to a second threshold, it is determined that the terminal device is located indoors. The first threshold is greater than the second threshold. For example, if the first threshold is 90%, when the confidence value of the terminal device being located indoors is 70%, it is determined that the terminal device does not meet the condition of being located indoors, that is, the terminal device is located outdoors. If the second threshold is 60%, when the confidence value of the terminal device being located indoors is 70%, it is determined that the terminal device meets the condition of being located indoors, that is, the terminal device is located indoors. For another example, if it is recognized that the terminal device is located indoors, but confidence is only 30%, it indicates that recognition accuracy is not high in this case. If confidence is 95%, it indicates that the recognition is accurate.

The first message used to send the first information element may be a radio resource control (RRC) message sent by the terminal device to the access network device, for example, a measurement report (MeasurementReport) message, a terminal device information response (UEInformationResponse) message, an RRC resume complete (RRCResumeComplete) message, or an RRC setup complete (RRCSetupComplete) message.

Optionally, the terminal device may periodically send first information elements to the access network device. The first information elements may be carried in a same type of messages, or may be carried in different messages.

In the foregoing process, the terminal device actively obtains the indoor or outdoor state information of the terminal device, and reports the state information to the access network device, so that the access network device determines, based on the indoor or outdoor state reported by the terminal device, the access frequency for communication connection between the terminal device and the access network device. This process enables the access network device to obtain the access frequency of the terminal device in real time, thereby improving efficiency of adjusting the access frequency of the terminal device.

In the foregoing description, the terminal device actively sends the first information element to the access network device, to provide a state of whether the terminal device is located indoors and outdoors. Optionally, alternatively, the access network device may send a request message to the terminal device, and the terminal device feeds back the indoor or outdoor state of the terminal device to the access network device based on the request message. That is, before step 502, the method further includes step 504: The access network device sends a first request message to the terminal device, where the first request message is used to request to obtain the first information element.

The first request message sent by the access network device to the terminal device may be an RRC message, including an RRC reconfiguration (RRCReconfiguration) message, a logged measurement configuration (LoggedMeasurementConfiguration) message, a terminal device information request (UEInformationRequest) message, or the like. The terminal device may spontaneously determine whether the terminal device is located indoors or outdoors, and then send the indoor or outdoor information to the access network device after receiving the first request message sent by the access network device. Alternatively, after receiving the first request message sent by the access network device, the terminal device may determine whether the terminal device is located indoors or outdoors, and send the indoor or outdoor information to the access network device. That is, step 504 may be performed before step 501, or may be performed after step 501. A sequence of the two is not limited in this embodiment of this application.

In this embodiment of this application, the access network device sends the first request message to the terminal device, to request to obtain the indoor or outdoor state information of the terminal device, so that the access network device determines, based on the indoor or outdoor state reported by the terminal device, the access frequency for communication connection between the terminal device and the access network device. This process enables the access network device to adjust the access frequency of the terminal device based on a requirement, thereby improving an adaptation probability of the access frequency of the terminal device.

In some cases, alternatively, the access network device may send a request message to a positioning device to obtain the indoor or outdoor state information of the terminal device. The positioning device sends a request message to the terminal device based on the request message, and then the terminal device sends the indoor or outdoor state information of the terminal device to the access network device. That is, before step 502, the method further includes step 506: The positioning device sends a first prompt message to the terminal device, where the first prompt message is used to prompt the terminal device to send the first information element to the access network device.

The first prompt message sent by the positioning device to the terminal device may be a long term evolution (LTE) positioning protocol (LPP) message, or may be a capability request message, an auxiliary data providing message, a location information request message, or the like.

After obtaining the first information element sent by the terminal device, the access network device determines, based on the indication of whether the terminal device is located indoors or outdoors, the access parameter of the terminal device, including the access frequency. For example, for 2.3 GHz that is an operating frequency of a military radar, in an outdoor scenario, if an industrial or commercial terminal device and the access network device also operate at the 2.3 GHz frequency, interference may be caused to operation of the military radar. Therefore, if it is determined that the terminal device is located outdoors, an access frequency of the terminal device that is determined by the access network device is another frequency other than 2.3 GHz, such as 2.1 GHz. If it is determined that the terminal device is located indoors, indicating that a possibility of causing interference to operation of the military radar is relatively small, the access frequency of the terminal device that is determined by the access network device may be 2.3 GHz.

Similarly, for another military communication frequency, a space communication frequency, or another frequency corresponding to high-priority communication, the terminal device is also allowed to communicate at this frequency when it is determined that a possibility of causing interference by communication of the terminal device to high-priority communication is small. In addition, the frequency corresponding to high-priority communication may also be used in an indoor scenario. In this case, communication of the terminal device may use another frequency in an outdoor scenario, to avoid interference to high-priority communication.

After determining the access frequency corresponding to the terminal device, the access network device may send a message to the terminal device at the access frequency, so that the terminal device also performs feedback at the access frequency. Alternatively, the access network device may send a first parameter to the terminal device, and the terminal device determines, based on the first parameter, the access frequency used to initiate access to the access network device.

It can be learned that, in this embodiment of this application, the terminal device reports the indoor or outdoor state information of the terminal device, so that the access network device determines the access frequency of the terminal device based on the obtained indoor or outdoor state information of the terminal device. In this way, a communication frequency of the terminal device can be flexibly adjusted, to avoid interference caused by an improper communication frequency of the terminal device to other communication in an indoor or outdoor scenario, and improve adaptation of communication of the terminal device to the indoor or outdoor scenario.

Figure 3:
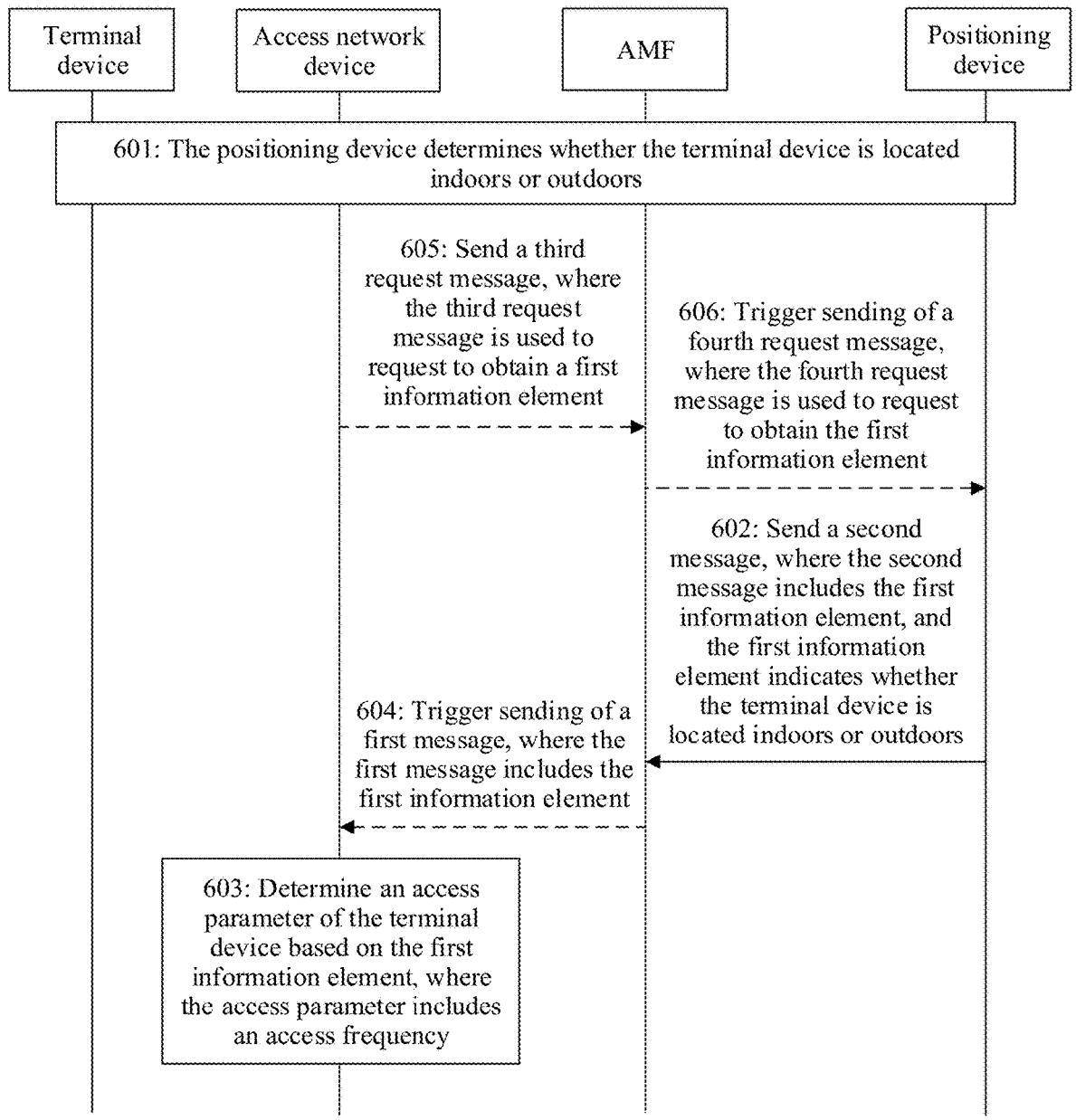
FIG. 3 is a flowchart of an indoor-outdoor determining-based uplink transmission method according to an embodiment of this application.

In some cases, alternatively, the positioning device may send the indoor or outdoor state information of the terminal device to the access network device. FIG. 3 is a flowchart of an indoor-outdoor determining-based uplink transmission method according to an embodiment of this application. As shown in FIG. 3, the method includes the following steps.

601. A positioning device determines whether a terminal device is located indoors or outdoors.

602. The positioning device sends a first message to an access network device by using an access and mobility management unit AMF, where the first message includes a first information element, and the first information element indicates whether the terminal device is located indoors or outdoors.

603. The access network device receives the first message, and determines an access parameter of the terminal device based on the first information element, where the access parameter includes an access frequency.

The positioning device may determine indoor or outdoor state information of the terminal device, including whether being located indoors or outdoors. A method for determining, by the positioning device, whether the terminal device is located indoors or outdoors includes: The positioning device obtains positioning measurement data from the terminal device, and determines, based on the positioning measurement data, whether the terminal device is located indoors or outdoors.

The obtaining the indoor or outdoor state information of the terminal device by the positioning device requires participation of the terminal device and the access network device. That is, location information of the terminal device is obtained by using a 3GPP Release-16 UE-based positioning technology, including a DL-TDOA positioning technology, a DL-AoD positioning technology, a multi-RTT positioning technology, or the like. In this process, the terminal device measures a PRS sent by each access network device, and an obtained measurement quantity such as a DL RSTD may be used for positioning calculation. In a process of obtaining the measurement quantity, the positioning device may send, to the terminal device, auxiliary information, including PRS configuration of each access network device, location information of the access network device, and the like. The positioning calculation may be performed on the terminal device, and then the terminal device sends the location information of the terminal device obtained through calculation to the positioning device. Alternatively, the terminal device may send a measurement result to the positioning device, and then the positioning device performs the positioning calculation to obtain the location information of the terminal device. After obtaining the location information, the positioning device determines, with reference to a digital map, whether the terminal device is located indoors or outdoors.

Optionally, a method for determining, by the positioning device, whether the terminal device is located indoors or outdoors includes: The positioning device obtains the indoor or outdoor state information of the terminal device from the terminal device, and determines whether the terminal device is located indoors or outdoors.

From the description of the method embodiment corresponding to FIG. 2A and FIG. 2B, the terminal device may determine, by using a quantity of visible satellites, whether the terminal device is located indoors or outdoors, or determine, by using a sensor parameter obtained by a sensor, whether the terminal device is located indoors or outdoors, and the positioning device may send a request message to the terminal device, to directly obtain information indicating whether the terminal is located indoors or outdoors, and then forward the result to the access network device.

After determining the indoor or outdoor state information of the terminal device, the positioning device sends the first message to the access network device by using the AMF. The first message includes the first information element used to indicate whether the terminal device is located indoors or outdoors. Optionally, the first information element may be an indoor or outdoor recognition result, or the first information element may be a confidence value of an indoor or outdoor recognition result. For specific descriptions, refer to corresponding descriptions in the embodiment in FIG. 2A and FIG. 2B. Details are not described herein again.

During communication between the positioning device and the access network device, a message needs to be transited or forwarded by using the access and mobility management function (Access and Mobility Management Function, AMF). For details, refer to step 604 in FIG. 3: The positioning device sends a second message to the AMF, where the second message includes the first information element. After receiving the second message, the AMF triggers generation of the first message based on the second message, where the first message includes the first information element. The access network device receives the first message from the AMF, and obtains the first information element. The second message sent by the positioning device to the AMF may be an Nlmf message of a network location management function (Location management function, LMF), and the first message sent by the AMF to the access network device may be a Next Generation Application Protocol (Next Generation Application Protocol, NGAP) message.

Optionally, the positioning device may periodically send first information elements to the access network device by using the AMF. The first information elements sent in different periods may be carried in a same type of messages, or may be carried in different messages.

Optionally, the positioning device may send indoor or outdoor state information of one terminal device to the access network device by using the AMF, or may simultaneously send indoor or outdoor state information of a plurality of terminal devices to the access network device. The positioning device may simultaneously send indoor or outdoor state information of a plurality of terminal devices to the access network device based on indoor or outdoor state information content, for example, send indoor or outdoor state information of terminal devices located indoors to the access network device at a first time, and send indoor or outdoor state information of terminal devices located outdoors to the access network device at a second time. Alternatively, the positioning device may simultaneously send indoor or outdoor state information of a plurality of terminal devices to the access network device based on a communication time, for example, simultaneously send, to the access network device, indoor or outdoor state information of a plurality of terminal devices that have been logged in communication with the access network device within a time range P.

In the foregoing process, the positioning device actively obtains the indoor or outdoor state information of the terminal device, and reports the state information to the access network device, so that the access network device determines, based on the indoor or outdoor state of the terminal device, the access frequency for communication connection between the terminal device and the access network device. This process enables the access network device to obtain the access frequency of the terminal device in real time, thereby improving efficiency of adjusting the access frequency of the terminal device. In addition, the positioning device may report indoor or outdoor state information of a plurality of terminal devices in batches, so that the access network device can determine access frequencies of the plurality of terminal devices in batches, thereby further improving efficiency of adjusting frequencies of the terminal devices.

In the foregoing description, the positioning device actively sends the first information element to the access network device by using the AMF, to provide a state of whether the terminal device is located indoors and outdoors. Optionally, the phrase first location information element may be used, in some embodiments, to describe the first information element which can convey the state of whether the terminal device is indoors or outdoors. Optionally, alternatively, the access network device may send a request message to the positioning device by using the AMF. The positioning device feeds back the indoor or outdoor state of the terminal device to the access network device based on the request message. That is, before step 602, the method further includes the following steps:

605. The access network device sends a third request message to the AMF, where the third request message is used to request to obtain the first information element.

606. The AMF sends a fourth request message to the positioning device based on the third request message, where the fourth request message is used to request to obtain the first information element. Specifically, the access network device sends the third request message, to request to obtain the first information element. The AMF receives the third request message, and the AMF triggers generation of the fourth request message based on the third request message, and sends the fourth request message to the positioning device, to request to obtain the first information element. The positioning device sends the first message (including the first information element) to the AMF based on the fourth request message. The AMF sends the second message (including the first information element) to the positioning device, so that the access network device obtains the first information element. The third request message sent by the access network device to the AMF may be an NGAP message, and the fourth request message sent by the AMF to the positioning device may be an Nlmf message.

The positioning device may spontaneously determine whether the terminal device is located indoors or outdoors, and then send, to the access network device after receiving the first request message sent by the access network device, the information indicating whether the terminal device is located indoors or outdoors. Alternatively, after receiving the request message, the positioning device may determine whether the terminal device is located indoors or outdoors, and send corresponding information to the access network device by using the AMF. That is, step 605 and step 606 may be performed before step 601, or may be performed after step 601. A sequence of the two is not limited in this embodiment of this application.

In this embodiment of this application, the access network device sends the third request message to the positioning device by using the AMF, to request to obtain the indoor or outdoor state information of the terminal device, so that the access network device determines, based on the indoor or outdoor state of the terminal device, the access frequency for communication connection between the terminal device and the access network device. This process enables the access network device to adjust the access frequency of the terminal device based on a requirement, thereby improving an adaptation probability of the access frequency of the terminal device.

After obtaining the first information element sent by the terminal device, the access network device determines, based on the indication of whether the terminal device is located indoors or outdoors, the access parameter of the terminal device, including the access frequency, to avoid channel interference caused by communication of the terminal device indoors or outdoors at some frequencies to important communication that is also located indoors or outdoors. Optionally, the access parameter may further include an access period, an access duration, or the like, to further avoid interference that may be caused by communication between the terminal device and the access network device to other communication.

It can be learned that, in this embodiment of this application, the positioning device reports the indoor or outdoor state information of the terminal device, so that the access network device determines the access frequency of the terminal device based on the obtained indoor or outdoor state information of the terminal device. In this way, a communication frequency of the terminal device can be flexibly adjusted, to avoid interference caused by an improper communication frequency of the terminal device to other communication in an indoor or outdoor scenario, and improve adaptation of communication of the terminal device to the indoor or outdoor scenario.

Figure 4:
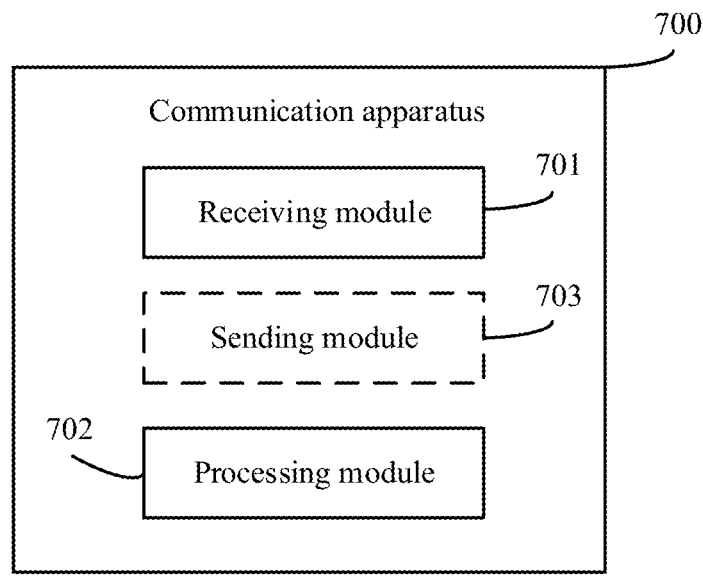
FIG. 4 is a schematic diagram of a structure of a communication apparatus according to an embodiment of this application.

FIG. 4 shows a communication apparatus 700 according to an embodiment of this application, which may be configured to perform the indoor-outdoor determining-based uplink transmission method in FIG. 2A and FIG. 2B or FIG. 3 that is applied to an access network device and specific embodiments. The access network device may be an access network device, or a chip that may be configured on the access network device. The apparatus includes a receiving module 701 and a processing module 702.

The receiving module 701 is configured to receive a first message, where the first message includes a first information element, and the first information element indicates whether a terminal device is located indoors or outdoors.

The processing module 702 is configured to determine an access parameter of the terminal device based on the first information element, where the access parameter includes an access frequency.

Optionally, the apparatus further includes a sending module 703, configured to send a request message to the terminal device or a positioning device, to request to obtain the first information element.

Optionally, the processing module 702 may be a chip, an encoder, an encoding circuit, or another integrated circuit that can implement the method in this application.

Optionally, the receiving module 701 and the sending module 703 may be an interface circuit or a transceiver. The receiving module 701 and the sending module 703 may be independent modules, or may be integrated into a transceiver module (not shown in the figure). The transceiver module may implement functions of the receiving module 701 and the sending module 703, and may be an interface circuit or a transceiver.

Because the specific method and embodiment have been described above, and the apparatus 700 is configured to perform the indoor-outdoor determining-based uplink transmission method corresponding to the access network device, reference may be made to related parts in the corresponding embodiment. Details are not described herein again.

Optionally, the apparatus 700 may further include a storage module (not shown in the figure). The storage module may be configured to store data and/or signaling. The storage module may be coupled to the processing module 702, or may be coupled to the receiving module 701 or the sending module 703. For example, the processing module 702 may be configured to read the data and/or signaling in the storage module, so that the key obtaining method in the foregoing method embodiment is performed.

Figure 5:
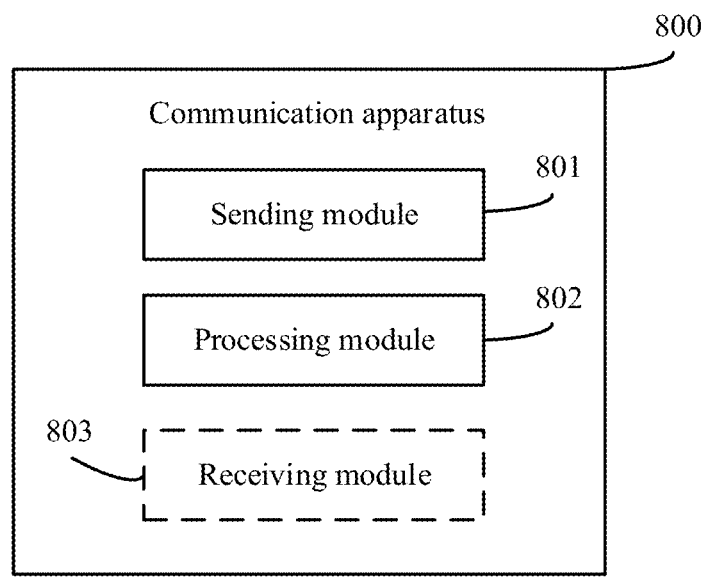
FIG. 5 is a schematic diagram of a structure of another communication apparatus according to an embodiment of this application.

FIG. 5 shows a communication apparatus 800 according to an embodiment of this application, which may be configured to perform the indoor-outdoor determining-based uplink transmission method in FIG. 2A and FIG. 2B that is applied to a terminal device and specific embodiments. The apparatus may be a terminal device, or a chip that may be configured on the terminal device. In a possible implementation, as shown in FIG. 5, the communication apparatus 800 includes a sending module 801 and a processing module 802.

The processing module 802 is configured to determine whether the terminal device is located indoors or outdoors.

The sending module 801 is configured to send a first message to an access network device, where the first message includes a first information element, and the first information element indicates whether the terminal device is located indoors or outdoors.

Optionally, the terminal device further includes a receiving module 803, configured to receive a first request message from the access network device, where the first request message is used to request to obtain the first information element.

Optionally, the receiving module 803 is further configured to receive a second request message from a positioning device, where the second request message is used to request to obtain the first information element, and the second request message is generated by the positioning device based on a request message that is sent by the access network device and that is used to obtain the first information element.

Optionally, the processing module 802 is specifically configured to: determine location information of the terminal device based on a received positioning signal, and determine, based on the location information, whether the terminal device is located indoors or outdoors; or obtain a quantity of visible satellites, and determine, based on whether the quantity of visible satellites is greater than a first preset threshold, whether the terminal device is located indoors or outdoors; or determine, by using a sensor parameter value, whether the terminal device is located indoors or outdoors.

Optionally, the processing module 802 may be a chip, an encoder, an encoding circuit, or another integrated circuit that can implement the method in this application.

Optionally, the receiving module 803 and the sending module 801 may be an interface circuit or a transceiver. The receiving module 803 and the sending module 801 may be independent modules, or may be integrated into a trans-ceiver module (not shown in the figure). The transceiver module may implement functions of the receiving module 803 and the sending module 801, and may be an interface circuit or a transceiver.

Because the specific method and embodiment have been described above, and the apparatus 800 is configured to perform the indoor-outdoor determining-based uplink transmission method corresponding to the terminal device, reference may be made to related parts in the corresponding embodiment. Details are not described herein again.

Optionally, the apparatus 800 may further include a storage module (not shown in the figure). The storage module may be configured to store data and/or signaling. The storage module may be coupled to the processing module 802, or may be coupled to the receiving module 803 or the sending module 801. For example, the processing module 802 may be configured to read the data and/or signaling in the storage module, so that the key obtaining method in the foregoing method embodiment is performed.

Figure 6:
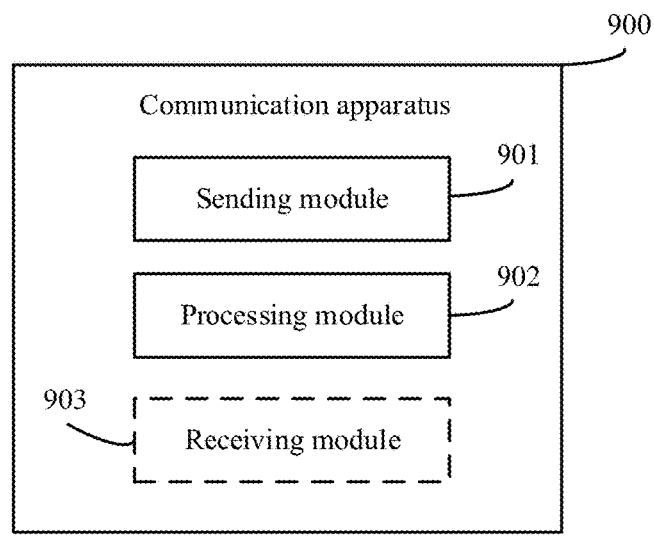
FIG. 6 is a schematic diagram of a structure of another communication apparatus according to an embodiment of this application.

FIG. 6 shows a communication apparatus 900 according to an embodiment of this application, which may be configured to perform the indoor-outdoor determining-based uplink transmission method in FIG. 3 that is applied to a positioning device and specific embodiments. The apparatus may be a positioning device, or a chip that may be configured on the positioning device. In a possible implementation, as shown in FIG. 6, the communication apparatus 900 includes a processing module 902 and a sending module 901.

The processing module 902 is configured to determine whether a terminal device is located indoors or outdoors.

The sending module 901 is configured to send a first message to an access network device by using an access and mobility management unit AMF, where the first message includes a first information element, and the first information element indicates whether the terminal device is located indoors or outdoors.

Optionally, the processing module 902 is specifically configured to obtain positioning measurement data from the terminal device, and determine, based on the positioning measurement data, whether the terminal is located indoors or outdoors.

Optionally, the processing module 902 is specifically configured to learn, from the terminal device, whether the terminal device is located indoors or outdoors.

Optionally, the sending module 901 is specifically configured to send a second message to the AMF, to trigger the AMF to send the first message to the access network device, where the second message includes the first information element.

Optionally, the positioning device further includes a receiving module 903, configured to receive, by using the AMF, a third request message sent by the access network device, where the third request message is used to request to obtain the first information element.

Optionally, the receiving module 903 is specifically configured to receive a fourth request message sent by the AMF, where the access network device triggers, by using the third request message, the AMF to send the fourth request message.

Optionally, the processing module 902 may be a chip, an encoder, an encoding circuit, or another integrated circuit that can implement the method in this application.

Optionally, the receiving module 903 and the sending module 901 may be an interface circuit or a transceiver. The receiving module 903 and the sending module 901 may be independent modules, or may be integrated into a transceiver module (not shown in the figure). The transceiver module may implement functions of the receiving module 903 and the sending module 901, and may be an interface circuit or a transceiver.

Because the specific method and embodiment have been described above, and the apparatus 900 is configured to perform the indoor-outdoor determining-based uplink transmission method corresponding to the positioning device, reference may be made to related parts in the corresponding embodiment. Details are not described herein again.

Optionally, the apparatus 900 may further include a storage module (not shown in the figure). The storage module may be configured to store data and/or signaling. The storage module may be coupled to the processing module 902, or may be coupled to the receiving module 903 or the sending module 901. For example, the processing module 902 may be configured to read the data and/or signaling in the storage module, so that the key obtaining method in the foregoing method embodiment is performed.

Figure 7:
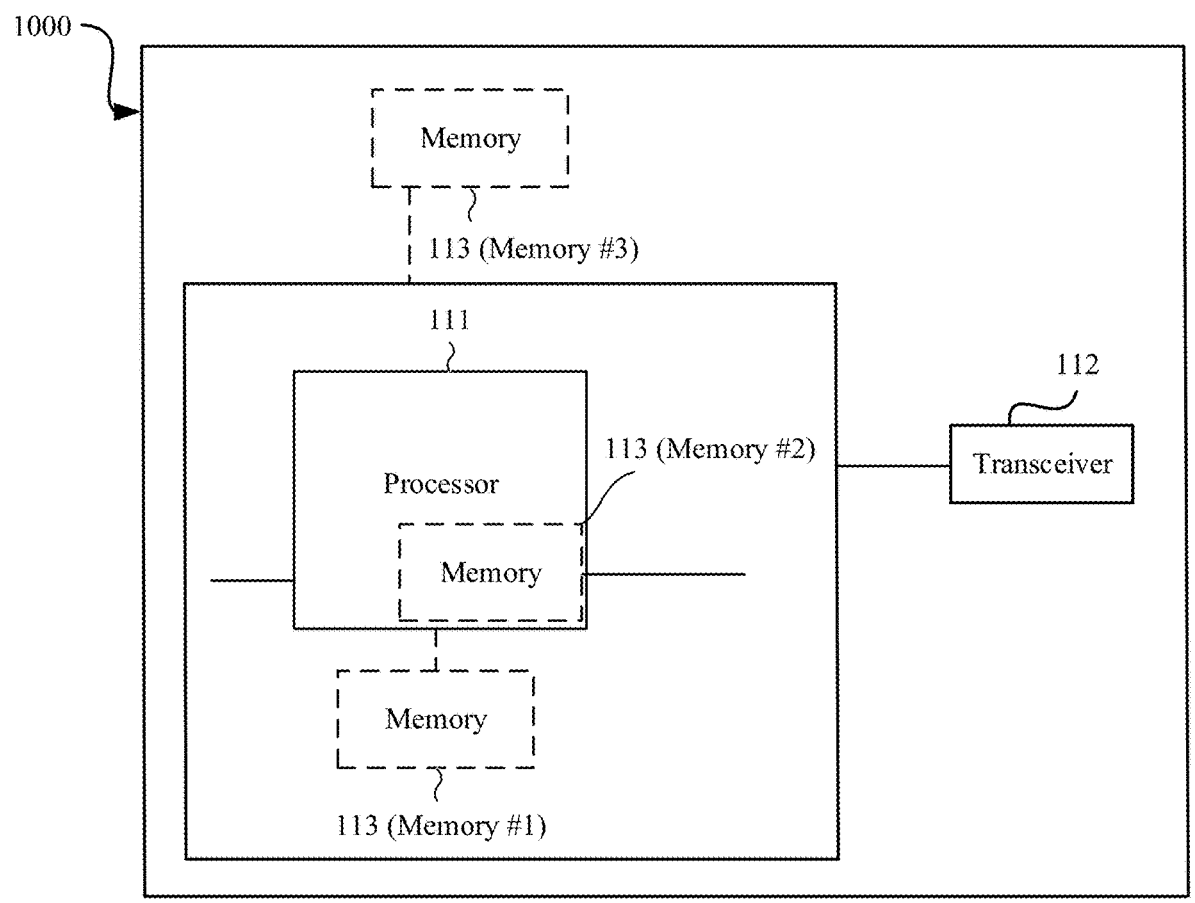
FIG. 7 is a schematic diagram of a structure of a communication apparatus according to an embodiment of this application.

FIG. 7 is a schematic diagram of a structure of a communication apparatus according to an embodiment of this application. For a structure of the access network device, the terminal device, or the positioning device, refer to the structure shown in FIG. 7. The communication apparatus 1000 includes a processor 111 and a transceiver 112. The processor 111 and the transceiver 112 are electrically coupled.

The processor 111 is configured to execute some or all computer program instructions in a memory. When the some or all computer program instructions are executed, the apparatus is enabled to perform the method according to any one of the foregoing embodiments.

The transceiver 112 is configured to communicate with another device, for example, receive a first message, where the first message includes a first information element, and the first information element indicates whether a terminal device is located indoors or outdoors.

Optionally, a memory 113 is further included, configured to store computer program instructions. Optionally, the memory 113 (Memory #1) is located in the apparatus, the memory 113 (Memory #2) is integrated with the processor 111, or the memory 113 (Memory #3) is located outside the apparatus.

It should be understood that the communication apparatus 1000 shown in FIG. 7 may be a chip or a circuit, for example, a chip or circuit that may be disposed in a terminal apparatus or a communication apparatus. The transceiver 112 may alternatively be a communication interface. The transceiver includes a receiver and a transmitter. Further, the communication apparatus 1000 may further include a bus system.

The processor 111, the memory 113, and the transceiver 112 are connected by using the bus system. The processor 111 is configured to execute the instructions stored in the memory 113, to control the transceiver to receive a signal and send a signal, to complete steps of the first device or the second device in the implementation method in this application. The memory 113 may be integrated into the processor 111, or may be disposed separately from the processor 111.

In an implementation, a function of the transceiver 112 may be implemented by using a transceiver circuit or a dedicated transceiver chip. The processor 111 may be implemented by using a dedicated processing chip, a processing circuit, a processor, or a general-purpose chip. The processor may be a central processing unit (central processing unit, CPU), a network processor (network processor, NP), or a combination of a CPU and an NP. The processor may further include a hardware chip or another general-purpose processor. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field-programmable gate array (field-programmable gate array, FPGA), a generic array logic (generic array logic, GAL) and another programmable logic device, a discrete gate or a transistor logic device, a discrete hardware component, or a combination thereof. The general-purpose processor may be a microprocessor, or the processor may be any conventional processor or the like.

It may be further understood that the memory mentioned in embodiments of this application may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM) and is used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory described in this specification is intended to include but not limited to these memories and any memory of another appropriate type.

An embodiment of this application provides a computer storage medium, storing a computer program. The computer program includes instructions for performing the method corresponding to the access network device in the foregoing embodiment.

An embodiment of this application provides a computer storage medium, storing a computer program. The computer program includes instructions for performing the method corresponding to the terminal device in the foregoing embodiment.

An embodiment of this application provides a computer storage medium, storing a computer program. The computer program includes instructions for performing the method corresponding to the positioning device in the foregoing embodiment.

An embodiment of this application provides a computer program product including instructions. When the computer program product runs on a computer, the computer is enabled to perform the method corresponding to the access network device in the foregoing embodiment.

An embodiment of this application provides a computer program product including instructions. When the computer program product runs on a computer, the computer is enabled to perform the method corresponding to the terminal in the foregoing embodiment.

An embodiment of this application provides a computer program product including instructions. When the computer program product runs on a computer, the computer is enabled to perform the method corresponding to the positioning device in the foregoing embodiment.

It should be understood that sequence numbers of the foregoing processes do not mean execution sequences in embodiments of this application. The execution sequences of the processes should be determined based on functions and internal logic of the processes, and should not constitute any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method performed by an access network device, wherein the method comprises:
    receiving a first message that comprises a first location information element, and the first location information element indicates whether a terminal device is located indoors;
    determining an access frequency of the terminal device based on the first location information element, the access frequency for use by the terminal device during uplink access, wherein:
        if the first information element indicates that the terminal device is located indoors, the determined access frequency is a supplementary uplink (SUL) frequency, and
        if the first information element indicates that the terminal device is located outdoors, the determined access frequency is a frequency other than the SUL frequency; and
    sending a parameter to the terminal device, the parameter indicating to the terminal device the determined access frequency.

2. The method according to claim 1, wherein the first location information element comprises an indoor recognition result.

3. The method according to claim 2, wherein the indoor recognition result corresponds to a first identification.

4. The method according to claim 2, wherein the indoor recognition result corresponds to a default.

5. The method according to claim 1, wherein the first location information element represents recognition confidence, and comprises a percentage or a value of the recognition confidence.

6. The method according to claim 1, wherein the access network device sends a request message to the terminal device or a positioning device, to request to obtain the first location information element.

7. An access network device comprising at least one processor coupled to a memory comprising instructions, wherein the processor is configured to execute the instructions to perform the following steps:
    receiving a first message that comprises a first location information element, and the first location information element indicates whether a terminal device is located indoors;
    determining an access frequency of the terminal device based on the first location information element, the access frequency for use by the terminal device during uplink access, wherein:
        if the first information element indicates that the terminal device is located indoors, the determined access frequency is a supplementary uplink (SUL) frequency, and if the first information element indicates that the terminal device is located outdoors, the determined access frequency is a frequency other than the SUL frequency; and sending a parameter to the terminal device, the parameter indicating to the terminal device the determined access frequency.

8. The access network device according to claim 7, wherein the first location information element comprises an indoor recognition result.

9. The access network device according to claim 8, wherein the indoor recognition result corresponds to a first identification.

10. The access network device according to claim 8, wherein the indoor recognition result corresponds to a default.

11. The access network device according to claim 7, wherein the first location information element represents recognition confidence, and comprises a percentage or a value of the recognition confidence.

12. The access network device according to claim 7, wherein the steps further comprise sending a request message to the terminal device or a positioning device, to request to obtain the first location information element.

13. A non-transitory computer-readable medium comprising instructions that, when executed by a processor, enable the processor to perform the following steps:

receiving a first message that comprises a first location information element, and the first location information element indicates whether a terminal device is located indoors; and determining an access parameter of the terminal device based on the first location information element, wherein the access parameter comprises an access frequency of the terminal device.

14. The non-transitory computer-readable medium according to claim 13, wherein the first location information element comprises an indoor recognition result.

15. The non-transitory computer-readable medium according to claim 14, wherein the indoor recognition result corresponds to a first identification.

16. The non-transitory computer-readable medium according to claim 14, wherein the indoor recognition result corresponds to a default.

17. The non-transitory computer-readable medium according to claim 13, wherein the first location information element represents recognition confidence, and comprises a percentage or a value of the recognition confidence.

18. The non-transitory computer-readable medium according to claim 13, wherein the steps further comprise sending a request message to the terminal device or a positioning device, to request to obtain the first location information element.

* * * * *